US008186574B2

(12) United States Patent
Tsuzuki (10) Patent No.: US 8,186,574 B2
(45) Date of Patent: May 29, 2012

(54) IMAGE-FORMING SYSTEM

(75) Inventor: Toru Tsuzuki, Okazaki (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 191 days.

(21) Appl. No.: 12/606,525

(22) Filed: Oct. 27, 2009

(65) Prior Publication Data

US 2010/0127068 A1    May 27, 2010

(30) Foreign Application Priority Data

Nov. 27, 2008  (JP) ................. 2008-302825

(51) Int. Cl.
*G06F 17/00* (2006.01)
*G06K 5/00* (2006.01)
*G06K 15/00* (2006.01)
*G03G 21/00* (2006.01)
(52) U.S. Cl. ........ 235/375; 235/382; 358/1.14; 399/366
(58) Field of Classification Search .......... 235/375, 235/475, 476, 451, 492, 382; 340/572.1; 358/1.14, 1.16, 453, 401, 474; 399/366; 705/57
See application file for complete search history.

(56) References Cited

U.S. PATENT DOCUMENTS

| | | | |
|---|---|---|---|
| 7,414,745 B2 | 8/2008 | Yano | |
| 7,428,067 B2 | 9/2008 | Kiwada | |
| 7,454,528 B2 | 11/2008 | Kanoshima et al. | |
| 7,847,958 B2 * | 12/2010 | Ishikura | 358/1.14 |
| 2002/0170973 A1 | 11/2002 | Teraura | |
| 2004/0047000 A1 | 3/2004 | Watanabe et al. | |
| 2004/0109194 A1 | 6/2004 | Yano | |
| 2005/0013640 A1 * | 1/2005 | Kumakura et al. | 399/366 |
| 2005/0094183 A1 * | 5/2005 | Kojima | 358/1.14 |
| 2005/0141009 A1 | 6/2005 | Kiwada | |
| 2005/0200910 A1 | 9/2005 | Kanoshima et al. | |
| 2006/0275064 A1 * | 12/2006 | Minari | 399/366 |
| 2006/0279763 A1 * | 12/2006 | Tamura et al. | 358/1.14 |
| 2007/0003340 A1 * | 1/2007 | Yoshino | 399/366 |
| 2007/0083381 A1 * | 4/2007 | Farrell et al. | 705/1 |

(Continued)

FOREIGN PATENT DOCUMENTS

JP    2002-337426    11/2002

(Continued)

OTHER PUBLICATIONS

Japanese Official Action dated Nov. 9, 2010 together with English-language translation.

*Primary Examiner* — Michael G Lee
*Assistant Examiner* — Suezu Ellis
(74) *Attorney, Agent, or Firm* — Scully, Scott, Murphy & Presser, P.C.

(57) ABSTRACT

An image-forming system includes: a data-reading unit, an image-forming unit, and a restricting unit. The data-reading unit reads first additional data from a first storing member of a sheet member. The image-forming unit forms a first image based on the read first additional data by the data-reading unit. The restricting unit gives a restriction to the first additional data stored in the first storing member after the first additional data is read, in order to restrict the first image from being formed based on the first additional data stored in the first storing member subsequently.

9 Claims, 6 Drawing Sheets

U.S. PATENT DOCUMENTS

| | | | |
|---|---|---|---|
| 2007/0230986 A1 * | 10/2007 | Miyata | 399/84 |
| 2008/0074695 A1 | 3/2008 | Ikeno et al. | |
| 2008/0239406 A1 * | 10/2008 | Nakano | 358/401 |
| 2009/0201560 A1 * | 8/2009 | Hashimoto | 358/474 |

FOREIGN PATENT DOCUMENTS

| | | | |
|---|---|---|---|
| JP | 2004-86708 | | 3/2004 |
| JP | 2004-88584 | | 3/2004 |
| JP | 2004088586 A | * | 3/2004 |
| JP | 2005-148240 | | 6/2005 |
| JP | 2005-193422 A | | 7/2005 |
| JP | 2005-229376 A | | 8/2005 |
| JP | 2005244802 A | * | 9/2005 |
| JP | 2006-109378 A | | 4/2006 |
| JP | 2006-113190 A | | 4/2006 |
| JP | 2006-229670 | | 8/2006 |
| JP | 2007-060220 A | | 3/2007 |
| JP | 2008-47966 | | 2/2008 |
| JP | 2008-60788 | | 3/2008 |
| JP | 2008-76851 | | 4/2008 |

* cited by examiner

IMAGE-FORMING SYSTEM

CROSS REFERENCE TO RELATED APPLICATION

This application claims priority from Japanese Patent Application No. 2008-302825 filed Nov. 27, 2008. The entire content of this application is incorporated herein by reference.

TECHNICAL FIELD

The present invention relates to an image-forming system and an image-forming device.

BACKGROUND

Image-reading systems for reading a recording medium with attached storage unit (a sheet of paper with an IC chip, for example) are well known in the art. This type of image-reading system reads data from the IC chip attached to an original document and forms an image based on the data read from the IC chip onto a separate sheet of paper having an attached IC chip.

SUMMARY

However, this conventional image-reading system has one disadvantage in that the user is allowed to form images on sheets of paper based on data in the IC chip of the original document without any limitation on the number of sheets that can be produced.

In view of the foregoing, it is an object of the present invention to provide an image-forming system and an image-forming device capable of restricting users from reproducing images on multiple sheets of a recording medium based on stored data having the same content, such as data stored in an IC chip.

In order to attain the above and other objects, the invention provides an image-forming system including: a data-reading unit, an image-forming unit, and a restricting unit. The data-reading unit reads first additional data from a first storing member of a sheet member. The image-forming unit forms a first image based on the read first additional data by the data-reading unit. The restricting unit gives a restriction to the first additional data stored in the first storing member after the first additional data is read, in order to restrict the first image from being formed based on the first additional data stored in the first storing member subsequently.

Another aspect of the present invention provides an image-forming device including: a data-reading unit, an image-forming unit, and a restricting unit. The data-reading unit reads first additional data from a first storing member of a sheet member. The image-forming unit forms a first image based on the read first additional data by the data-reading unit. The restricting unit gives a restriction to the first additional data stored in the first storing member after the first additional data is read, in order to restrict the first image from being formed based on the first additional data stored in the first storing member subsequently.

BRIEF DESCRIPTION OF THE DRAWINGS

The particular features and advantages of the invention as well as other objects will become apparent from the following description taken in connection with the accompanying drawings, in which.

DETAILED DESCRIPTION

Next, a preferred embodiment of the present invention, will be described while referring to the accompanying drawings.

(Internal Structure of a Multifunction Peripheral)

Figure 1:
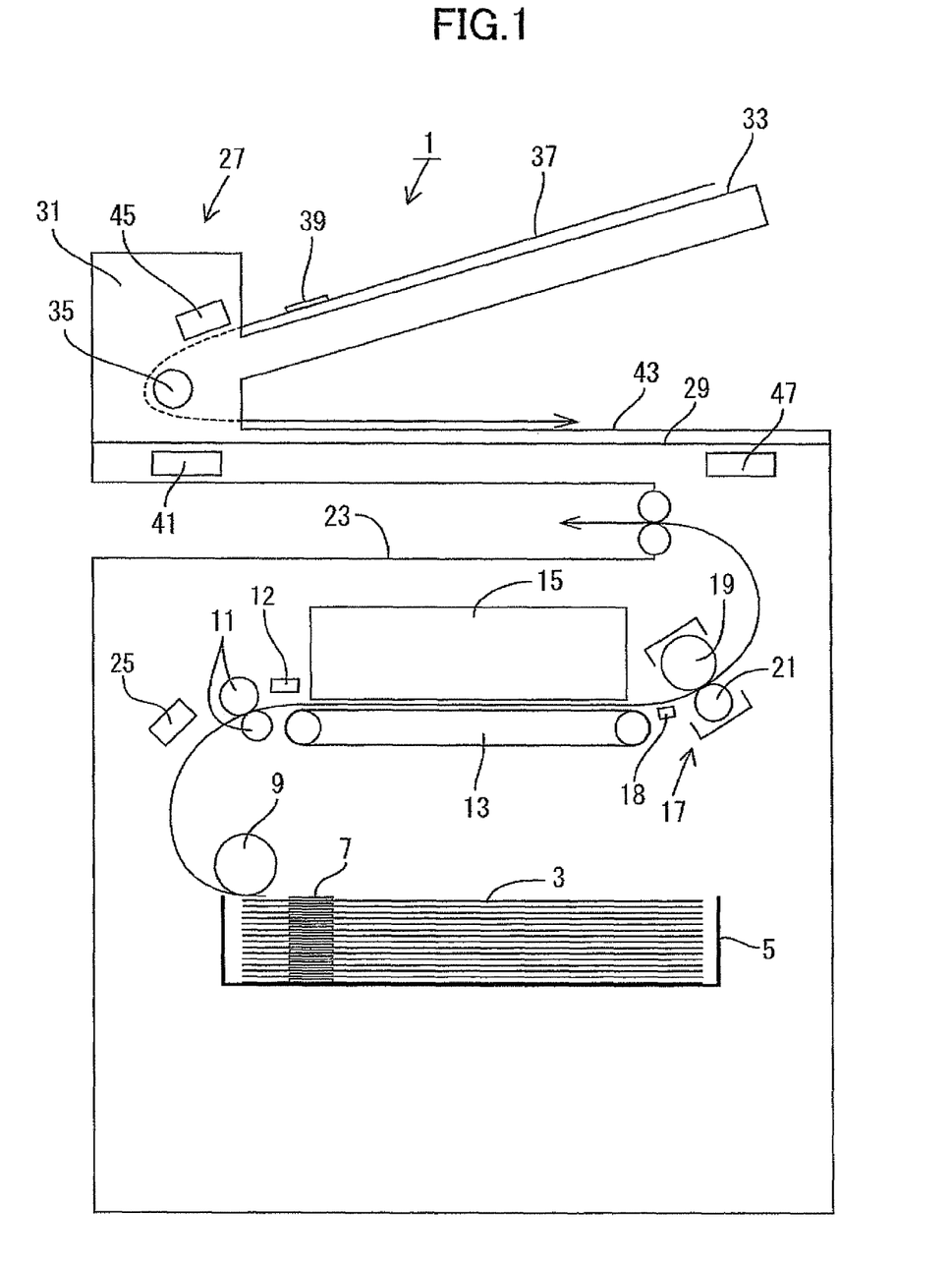
FIG. 1 is a conceptual image showing an internal structure of an MFP according to the preferred embodiment of the present invention.

FIG. 1 is a conceptual image showing the internal structure of a multifunction peripheral (hereinafter abbreviated as "MFP") 1, serving as the preferred embodiment of the image-forming device according to the present invention. A tray 5 is disposed in the bottom section of the MFP 1 for accommodating sheets 3 of a paper, for example, to be used in printing operations.

The sheets 3 may include sheets with RFID (radio frequency identification) tags 7, and sheets without RFID tags 7. The RFID tags 7 in the sheets 3 may be embedded in the sheets 3 or attached to the surfaces of the sheets 3.

A pickup roller 9 disposed above one end of the tray 5 picks up and conveys the sheets 3 accommodated in the tray 5 to a pair of registration rollers 11 one sheet at a time. After the sheet 3 is conveyed to the registration rollers 11, the registration rollers 11 adjust the registration of the sheet 3 and convey the sheet 3 onto a conveying belt 13 at a prescribed timing. A registration sensor 12 is disposed on the upstream side of the registration rollers 11 for detecting the leading edge of a sheet 3 pinched between the registration rollers 11. The registration sensor 12 may be disposed on the downstream side of the registration rollers 11.

In addition, an RFID reader/writer 25 for sheets being printed is disposed near the conveying path along which the sheets 3 are conveyed from the tray 5 to the conveying belt 13. The RFID reader/writer 25 can communicate wirelessly with (read data from or write data to) the RFID tag 7 in a sheet 3 being conveyed through radio waves emitted from an antenna (not shown).

Once the sheet 3 is conveyed onto the conveying belt 13, the conveying belt 13 continues to convey the sheet 3 while an image-forming unit 15 forms an image on the sheet 3 based on image data generated by a document-reading unit 27 described later (hereinafter, an image corresponding to data generated by the document-reading unit 27 will be referred to as an "original image") or based on RFID data RD stored in the RFID tag 7 of the sheet 3 (hereinafter, an image corresponding to RFID data RD will be referred to as an "RFID image"). The RFID data RD is configured of various data including image data, text data, and the like, as well as data for preventing simple reproduction of RFID images based on the RFID data RD in order to preserve the uniqueness of the RFID image reliably, such as unique data for identifying each sheet 3 with an RFID tag, confidential information, and user identification data.

Once the image-forming unit 15 has formed an image on the sheet 3, the conveying belt 13 conveys the sheet to a fixing unit 17. The fixing unit 17 has a heating roller 19 and a pressure roller 21 for pinching and conveying the sheet 3. As the sheet 3 passes between the heating roller 19 and pressure roller 21, the image formed on the sheet 3 is fixed to the sheet 3 by heat. Subsequently, the sheet 3 is discharged onto a discharge tray 23. A sensor 18 is also disposed near the fixing unit 17 for detecting when the sheet 3 has reached the fixing unit 17.

A document-reading unit 27 is disposed above the discharge tray 23. The document-reading unit 27 includes a document bed 29 on which an original document 37 to be scanned may be placed, a scanning unit 41 disposed beneath the document bed 29 for scanning the original document 37 placed on the document bed 29, and a document cover 31 disposed on the document bed 29 and capable of rotating open and closed thereon. The document cover 31 includes a document tray 33 in which an original document 37 having one or more sheets may be set, a conveying mechanism 35 for conveying sheets of the original document 37 one at a time to be scanned by the scanning unit 41, and a document discharge tray 43 for receiving the sheets conveyed by the conveying mechanism 35. The original document 37 may include sheets with or without RFID tags 39.

An RFID reader/writer 45 for original documents is disposed near the conveying path along which the original document 37 is conveyed between the document tray 33 and the scanning unit 41. If the original document 37 being conveyed on the conveying path has an RFID tag 39, the RFID reader/writer 45 can exchange data with the RFID tag 39 through wireless communications. An additional RFID reader/writer 47 for original documents is disposed near the document discharge tray 43. The RFID reader/writer 47 is capable of exchanging data with the RFID tag 39 of the original document 37 discharged on the document discharge tray 43.

When the original document 37 is set in the document tray 33, the RFID reader/writer 45 exchanges data with the RED tag 39 provided in the original document 37. When the original document 37 is placed on the document bed 29, the RFID reader/writer 47 exchanges data with the RFID tag 39 provided in the original document 37.

(Electrical Structure of the MFP)

Figure 2:
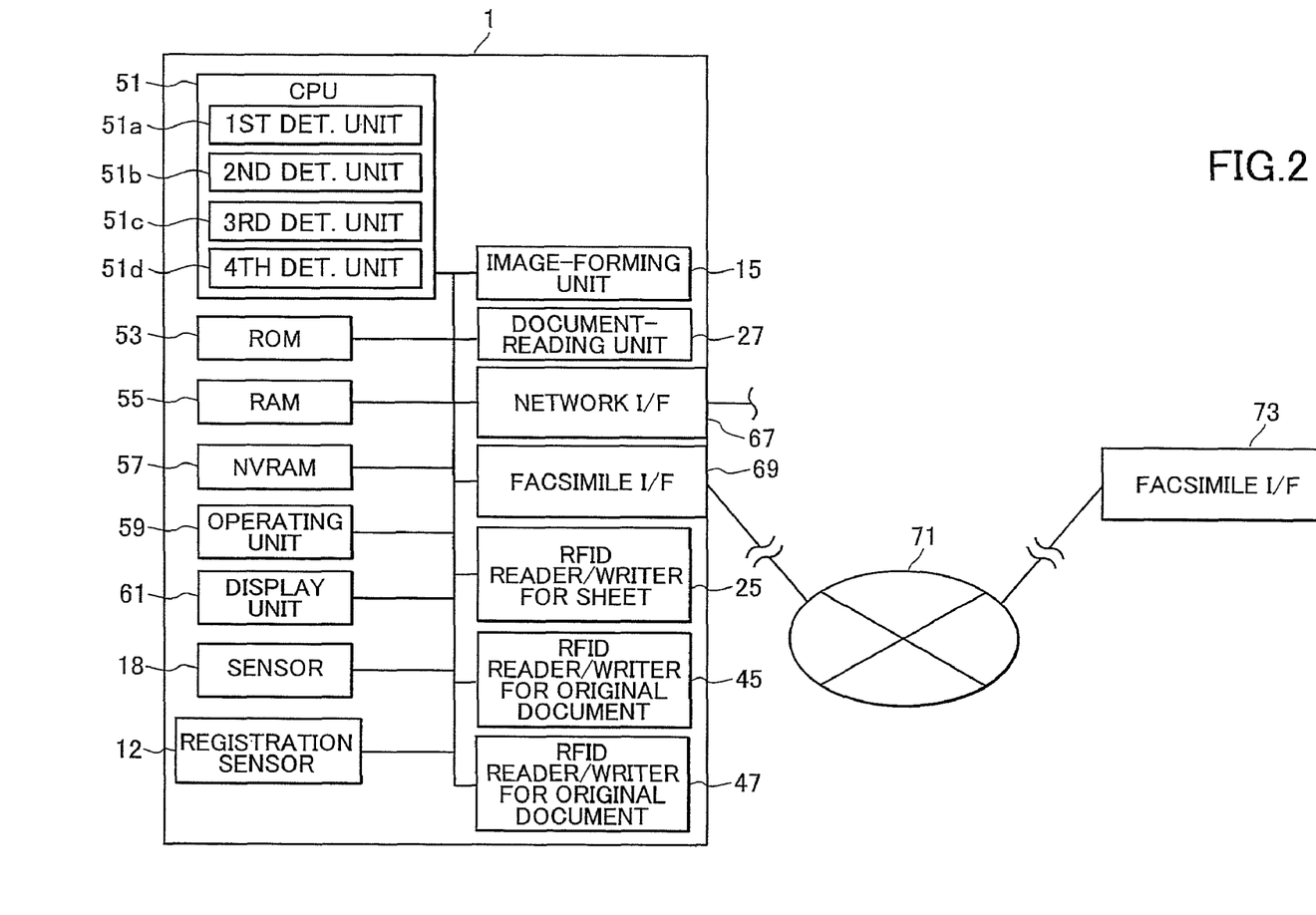
FIG. 2 is a block diagram showing an electrical structure of the MFP according to the preferred embodiment of the present invention.

FIG. 2 is a block diagram showing the electrical structure of the MFP 1. The MFP 1 includes a CPU 51, a ROM 53, a RAM 55, an NVRAM 57 (nonvolatile memory), an operating unit 59, a display unit 61, the image-forming unit 15, and the document-reading unit 27. The ROM 53 stores programs for executing various operations on the MFP 1, such as a normal image-forming process and an RFID image-forming process described later. The CPU 51 reads programs from the ROM 53 and executes the programs to perform various control processes while storing the results of operations in internal memory (the RAM 55 or NVRAM 57). The operating unit 59 includes a plurality of buttons by which the user can perform input operations. The display unit 61 includes a liquid crystal display for displaying configuration screens, the status of device operations, and the like; and indicator lamps.

The MFP 1 also includes a network interface 67 and a facsimile interface 69. The network interface 67 connects the MFP 1 to an external computer (not shown) or the like via a network, enabling bi-directional communications between the two devices. The facsimile interface 69 connects the MFP 1 to another external device 73 having a facsimile function via a public telephone network 71, enabling facsimile communications between the two devices.

The CPU 51 also controls the RFID reader/writer 25 for sheets being printed, and the RFID reader/writers 45 and 47 for original documents described above. The CPU 51 is connected to the registration sensor 12 and the sensor 18.

(RFID Image-Forming Process)

Figure 3:
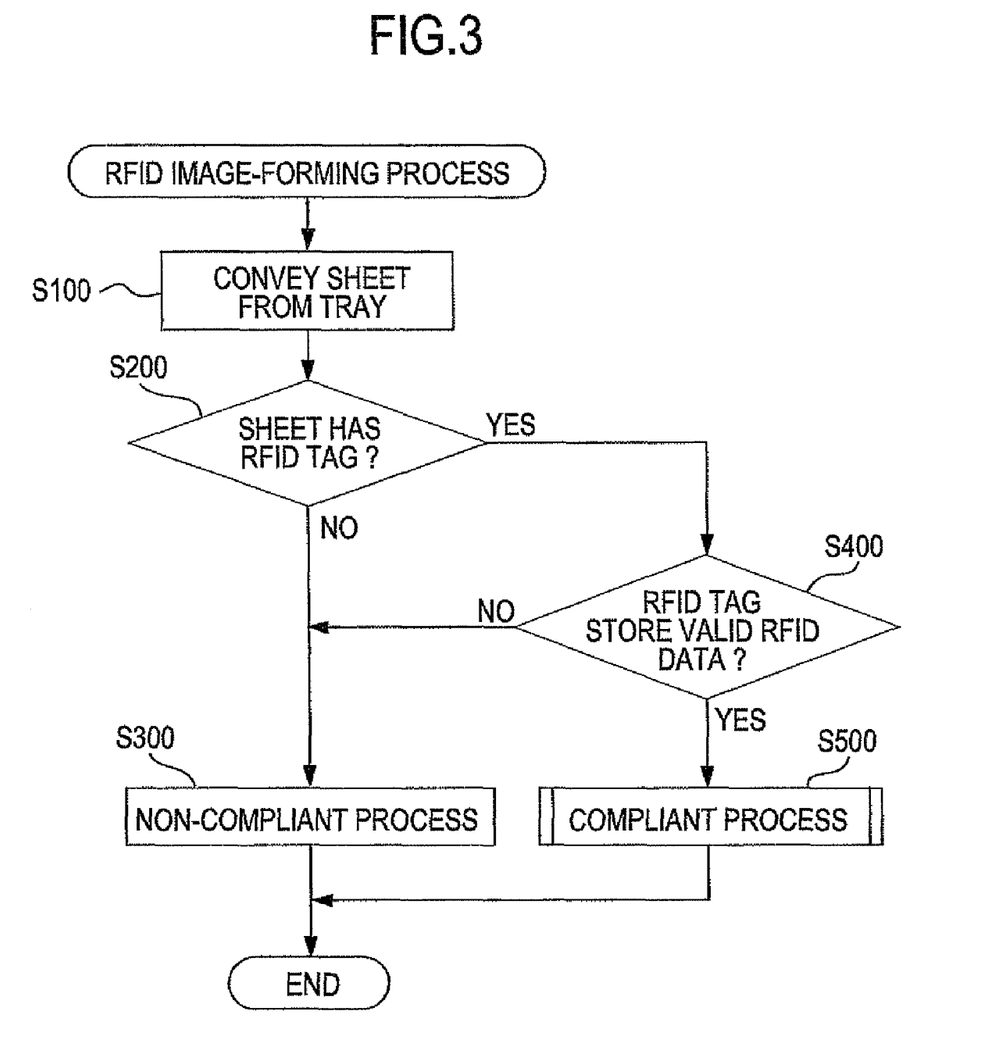
FIG. 3 is a flowchart illustrating steps in an RFID image-forming process executed on the MFP.
Figure 4:
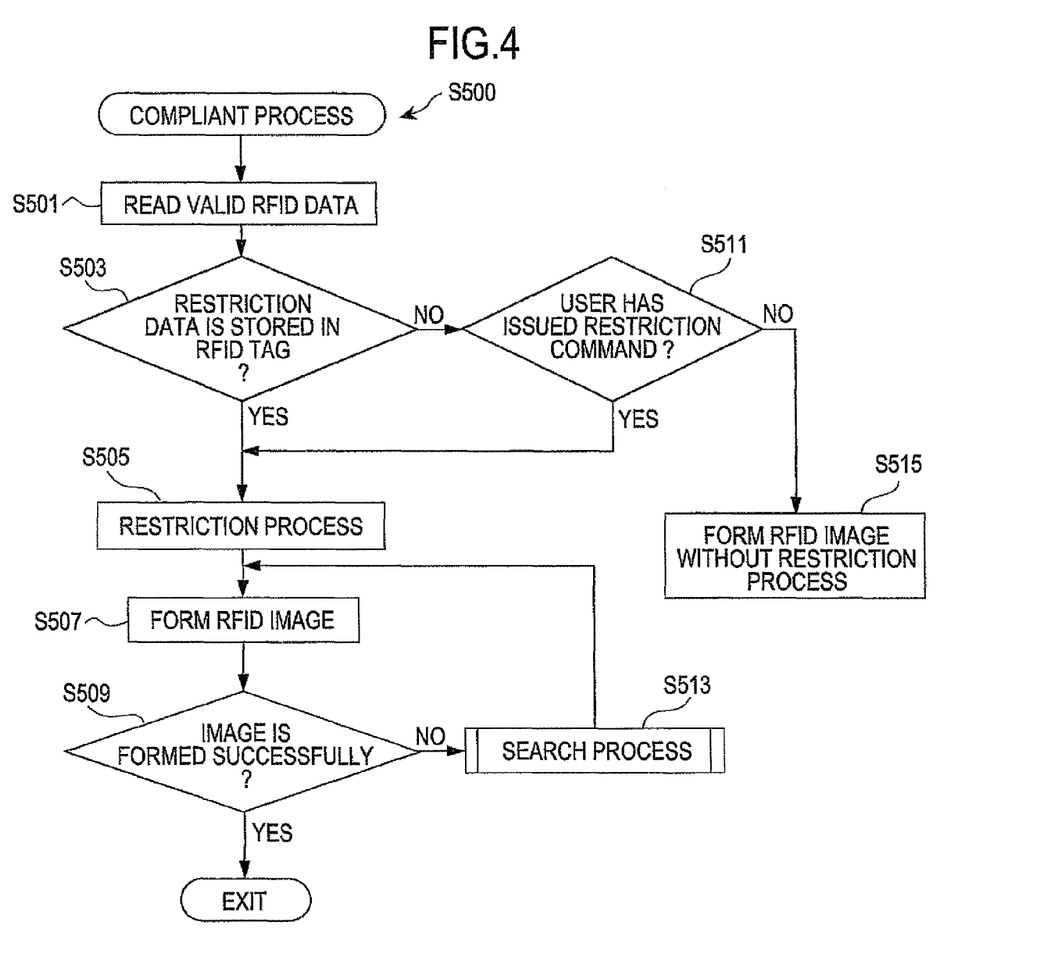
FIG. 4 is a flowchart illustrating steps in a compliant process shown in FIG. 3.
Figure 5:
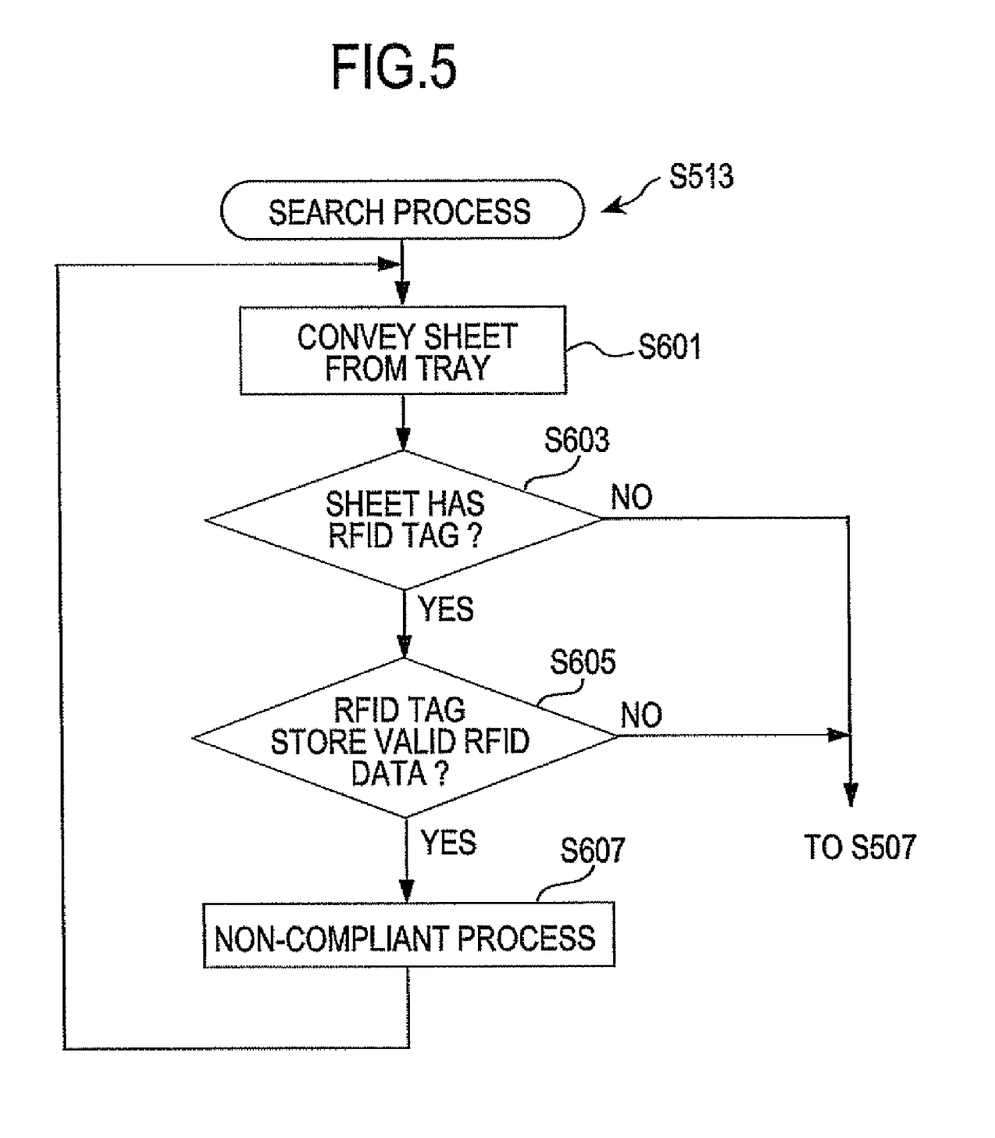
FIG. 5 is a flowchart illustrating steps in a search process shown in FIG. 4.
Figure 6:
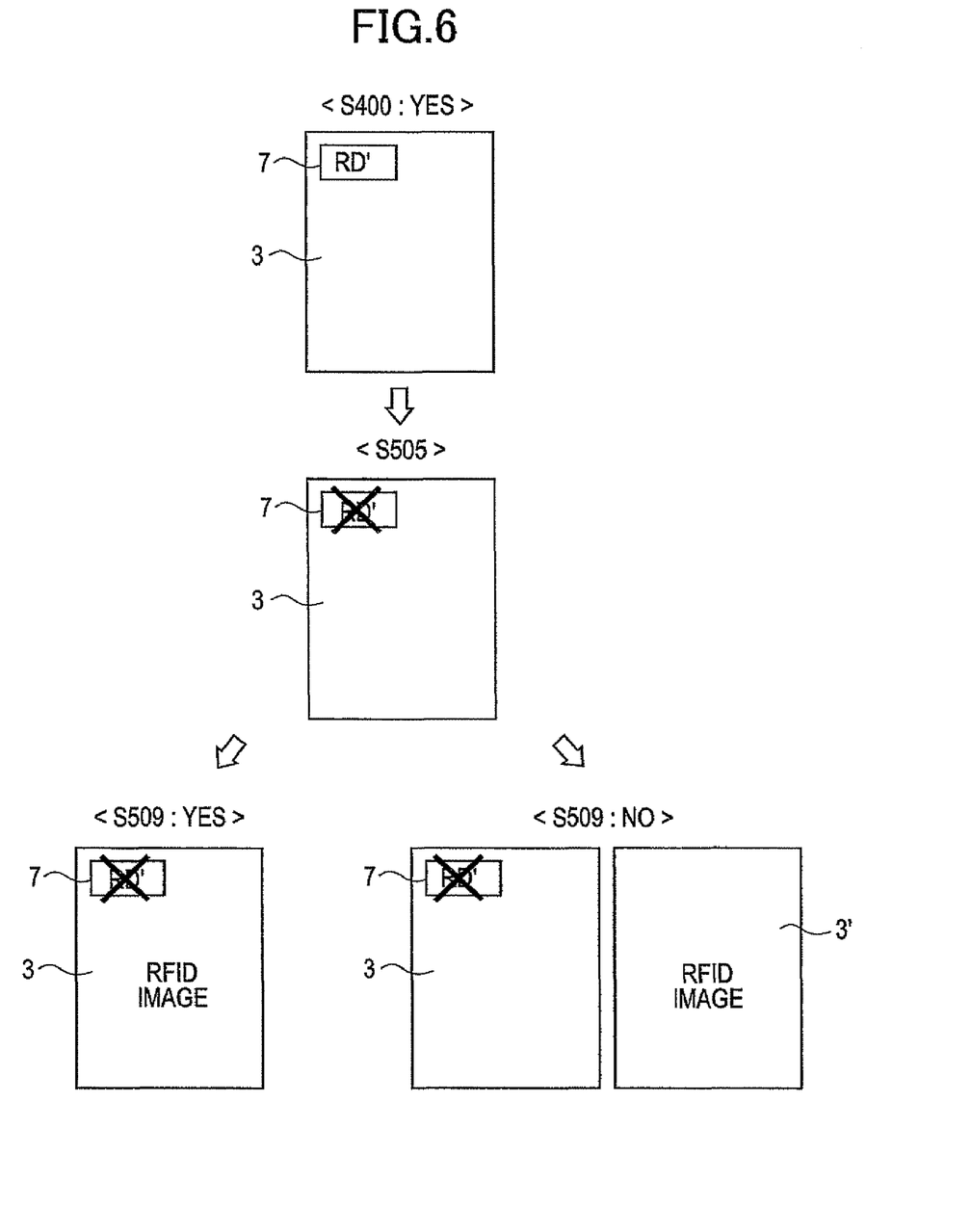
FIG. 6 conceptually illustrates a progress of forming an RFID image.

FIGS. 3 through 5 are flowcharts illustrating steps in an RFID image-forming process, and FIG. 6 conceptually illustrates the progress of forming an RFID image. For this process, the RFID data RD may be acquired from the RFID tag 7 of the sheet 3 loaded in the tray 5 or from the RFID tag 39 of the original document 37 set in the document-reading unit 27, but the following description will assume the case in which the RFID data RD is acquired from a sheet 3. The CPU 51 includes one or more of: a first determining unit that determines whether or not the first image has been formed on the sheet 3; a second determining unit that determines whether or not a recording medium has a second storing member; a third determining unit that determines whether or not the second storing member stores second additional data that is allowed to form a second image based on the second additional data; and a fourth determining unit that determines whether or not the restricting unit gives the restriction to the first additional data.

The user can specify whether to execute the RFID image-forming process based on the RFID data RD or a normal image-forming process based on image data through input operations on the operating unit 59. The CPU 51 executes the RFID image-forming process shown in FIGS. 3 through 5 when the user has specified this the RFID image-forming process. In the RFID image-forming process, the RFID reader/writer 25 reads the RFID data RD from the RFID tag 7 of the sheet 3. Subsequently, the CPU 51 controls the RFID reader/writer 25 to give a restriction to the RFID data RD stored in the RFID tag 7 to restrict any further processes for reading the RFID data RD from the RFID tag 7, while the image-forming unit 15 forms an RFID image on the sheet 3 based on the read RFID data RD.

Specifically, in S100 of FIG. 3, the CPU 51 controls the pickup roller 9 to convey one sheet 3 from the tray 5 toward the registration rollers 11. When the leading edge of the sheet 3 is pinched between the registration rollers 11, the rotation of the registration rollers 11 is halted. Here, the CPU 51 determines whether the sheet 3 has been gripped by the registration rollers 11 based on detection results from the registration sensor 12.

In S200 the CPU 51 determines whether the sheet 3 currently gripped by the registration rollers 11 has an RFID tag 7. Specifically, the CPU 51 controls the RFID reader/writer 25 to attempt wireless communications with an RFID tag 7 and determines whether the sheet 3 has an RFID tag 7 based on the success of those communications.

If the CPU 51 determines that the sheet 3 has an RFID tag 7 based on successful wireless communications (S200: YES), in S400 the CPU 51 determines whether the RFID tag 7 stores RFID data RD that has not been restricted (i.e. the restriction has not been given to the RFID data RD.) and is thus valid for forming an image (hereinafter referred to as "valid RFID data RD").

However, if the CPU 51 determines that the sheet 3 has no RFID tag 7 due to unsuccessful wireless communications (S200: NO) or if the CPU 51 determines that the sheet 3 has an RFID tag 7 but the RFID tag 7 does not store valid RFID data RD' (S200: YES, S400: NO), then the CPU 51 performs a non-compliant process in S300. In the non-compliant process the CPU 51 resumes rotational driving of the registration rollers 11 that were previously halted and discharges the sheet 3 onto the discharge tray 23 without forming an image with the image-forming unit 15. Subsequently, the CPU 51 ends the RFID image-forming process.

However, if the CPU 51 determines in S400 that the RFID tag 7 of the sheet 3 stores valid RFID data RD' (S400: YES), in S500 the CPU 51 executes a compliant process shown in FIG. 4. At this point, valid RFID data RD' is determined to be stored in the RFID tag 7 of the sheet 3, but an image has yet to be formed on the surface of the sheet 3, as depicted in "<S400: YES>" of FIG. 6.

(1) Compliant Process

In S501 of FIG. 4, the CPU 51 controls the RFID reader/writer 25 to read the valid RFID data RD' from the RFID tag 7. When a plurality of sets of valid RFID data RD' is stored in the RFID tag 7, the RFID reader/writer 25 may be controlled to read all valid RFID data RD' sets. However, in the preferred embodiment, the RFID reader/writer 25 is controlled to read only one set of valid RFID data RD', such as the valid RFID data RD' having the latest storage address.

In S503 the CPU 51 determines whether restriction instruction data is stored in the RFID tag 7. The restriction instruction data indicates that processes for reading data from the RFID tag 7 are to be restricted after the valid RFID data RD' has been read. The possible types of restriction instruction data are data restricting subsequent processes for reading only the same valid RFID data RD' that was read in S501 (hereinafter referred to as "partial restriction") and data restricting subsequent processes for reading all valid RFID data RD' sets stored on the RFID tag 7 (hereinafter referred to as "total restriction"). Having these options is convenient since a user may specify a partial restriction in order to handle each individual valid RFID data RD' and may specify a total restriction when it is desirable to treat all valid RFID data RD' sets at once.

If the CPU 51 determines in S503 that restriction instruction data is not stored in the RFID tag 7 (S503: NO), in S511 the CPU 51 determines whether the user has issued a restriction command. The restriction command indicates that processes for reading data from the RFID tag 7 are to be restricted after the valid RFID data RD' has been read. By performing input operations on the operating unit 59, for example, the user can issue a command to form the RFID image, issue a restriction command, and specify whether the restriction is a partial restriction or a total restriction.

If the CPU 51 determines that the RFID tag 7 does not store restriction instruction data and that the user has not issued a restriction command (S503: NO and S511: NO), in S515 the CPU 51 resumes driving the halted registration rollers 11 to convey the sheet 3 and controls the image-forming unit 15 to form the RFID image on the sheet 3 based on the valid RFID data RD', without performing any type of restriction process. Subsequently, the CPU 51 ends the compliant process and the RFID image-forming process.

However, if restriction instruction data is stored in the RFID tag 7 (S503: YES) or if the user has issued a restriction command (S511: YES), in S505 the CPU 51 executes a restriction process. In this process, the CPU 51 controls the RFID reader/writer 25 to implement the partial restriction or total restriction.

The method of restriction in the preferred embodiment involves writing prohibition data to the RFID tag 7 in association with a specific set of valid RFID data RD' or the RFID tag 7 itself in order to prohibit reading of the corresponding data. Hence, this restriction process prohibits subsequent processes to read the valid RFID data RD' targeted in the restriction process and restricts an image-forming process from being performed based on this valid RFID data RD' (see "<S505>" in FIG. 6, where the "x" indicates that a restriction process has been performed).

In S507 the CPU 51 resumes driving the halted registration rollers 11 to convey the sheet 3 and controls the image-forming unit 15 to begin forming the RFID image on the sheet 3 based on the valid RFID data RD'. In S509 the CPU 51 determines whether the image was formed successfully based on whether the sheet 3 has reached the fixing unit 17, for example. In other words, the CPU 51 determines that the image was formed successfully if the sensor 18 detects that the sheet 3 has reached the fixing unit 17 and determines that the image was not formed successfully due to an error, such as the sheet 3 becoming jammed or insufficient colorant in the image-forming unit 15, when the sensor 18 does not detect the sheet 3.

If the CPU 51 determines that the image was successfully formed (S509: YES), the CPU 51 ends the compliant process and the RFID image-forming process. At this time, the RFID image has been formed on the surface of the sheet 3, as indicated in "<S509: YES>" of FIG. 6. However, since the restriction process was performed to restrict subsequent reading of the RFID data RD from the RFID tag 7, the MFP 1 can prevent an image based on the same RFID data RD from being reproduced on another sheet.

(2) Search Process

However, if the CPU 51 determines that the image was not formed successfully (S509: NO), in S513 the CPU 51 performs a search process shown in FIG. 5. In the search process, the CPU 51 searches for a new sheet 3' on which an RFID image based on the valid RFID data RD' can be formed after the error is resolved.

In S601 of the search process shown in FIG. 5, the CPU 51 controls the pickup roller 9 to convey a new sheet 3' from the tray 5, halting rotation of the registration rollers 11 when the new sheet 3' is pinched therebetween. In S603 the CPU 51 determines whether the new sheet 3' has an RFID tag 7, as in S200 described above.

If the CPU 51 determines that the new sheet 3' has an RFID tag 7 (S603: YES), in 5605 the CPU 51 controls the RFID reader/writer 25 to determine whether the RFID tag 7 of the new sheet 3' stores valid RFID data RD" different from the valid RFID data RD' stored in the RFID tag 7 of sheet 3. If the RFID tag 7 of the new sheet 3' stores valid RFID data RD" (S605: YES), in S607 the CPU 51 discharges the new sheet 3' onto the discharge tray 23 without forming an image thereon, as described above in S300, and returns to S601.

However, if the CPU 51 determines that the new sheet 3' does not have an RFID tag 7 (S603: NO) or if the CPU 51 determines that the new sheet 3' has an RFID tag 7 but that the RFID tag 7 does not store valid RFID data RD" (S603: NO and S605: NO), the CPU 51 returns to S507 in FIG. 4 to form an RFID image, on the new sheet 3' based on the valid RFID data RD'. At this time, an RFID image is formed on the surface of the new sheet 3', as indicated in "<S509: NO>" of FIG. 6. However, since an error occurred to prevent the RFID image from being successfully formed on the initial sheet 3 and a restriction process was performed to restrict subsequent reading of the RFID data RD' from the RFID tag 7, the MFP 1 can prevent a new copy of an image based on the RFID data RD' from being formed on a sheet other than the sheet 3 and the new sheet 3'.

Effects of the Embodiment (1) According to the preferred embodiment described above, the MFP 1 restricts formation of an image based on RFID data RD stored in the RFID tag 7 of the sheet 3 or in the RFID tag 39 of the original document 37 after executing a process to read the RFID data RD. Accordingly, the MFP 1 can prevent images based on RFID data RD with the same content from being formed on a plurality of sheets (see "<S509: YES>" and "<S509: NO>" of FIG. 6).

For example, a company may distribute promotional leaflets having trivia questions printed therein, with the answers to the questions stored as RFID data in the RFID tag of the leaflet. A user of the MFP 1 who receives one of these leaflets can place the leaflet in the tray 5 or the document-reading unit 27 of the MFP 1 and print out the answers to the trivia questions on the leaflet by specifying the RFID image-forming process. However, once the answers have been printed one time, thereafter printing based on the RFID data stored in the tag is restricted, preventing the answers to the trivia questions from being printed on an unlimited number of other sheets. This process is particularly effective when the user wishes to limit reproduction of the RFID data.

(2) It is also possible to consider a case in which an image based on RFID data RD stored in the RFID tag 7 of a sheet 3 is formed on the same sheet 3. In this case, if the MFP 1 allows the user to form any number of images based on the same RFID data RD without limitation, RFID images would be superimposed over each other on the sheet 3 each time the RFID data RD is read from the RFID tag 7 of the sheet 3, resulting in a reduced quality of image formation due to offset between the images.

The MFP 1 of the preferred embodiment resolves this problem by prohibiting the formation of an RFID image based on the RFID data RD stored in the RFID tag 7 of the sheet 3 after the RFID data RD has been read once.

(3) Further, by executing the search process of FIG. 5 when the MFP 1 is unable to form the RFID image on the sheet 3 successfully, the MFP 1 can form the RFID image on a new sheet 3' (see "<S509: NO>" of FIG. 6). Moreover, sheets with RFID tags 7 storing valid RFID data RD" are excluded from use in this RFID image formation. Consequently, the MFP 1 can ensure that an image formed on the surface of a sheet is based on valid RFID data RD" possessed by the sheet itself.

(4) If the MFP 1 were configured to perform the restriction process after first executing the RFID image formation in S507 and discharging the sheet 3 onto the discharge tray 23, the user could conceivably remove the sheet 3 before the MFP 1 has completed the restriction process. Therefore, the MFP 1 according to the preferred embodiment performs the restriction process in S505 prior to the RFID image formation process of S507.

(5) The MFP 1 can also change whether or not the restriction process is executed based on a user instruction. Further, by storing restriction instruction data in the RFID tags 7 and 39, the MFP 1 can automatically determine whether to execute the restriction process.

Variations of the Embodiment

While the invention has been described in detail with reference to specific embodiments thereof, it would be apparent to those skilled in the art that many modifications and variations may be made therein without departing from the spirit of the invention, the scope of which is defined by the attached claims.

(1) The preferred embodiment described above gives an example of forming an RFID image on the same sheet 3 from which the RFID data RD was read, but the present invention is not limited to this configuration. When the MFP 1 reads the RFID data RD from an original document 37, for example, the MFP 1 may form an RFID image on a separate sheet 3 based on this RFID data RD.

(2) In the preferred embodiment described above, the MFP 1 is configured to not form an image corresponding to the original image on the original document 37 when forming an RFID image, but the present invention is not limited to this configuration. For example, if the user has set the original document 37 in the document-reading unit 27 and issued an instruction to perform a scanning process, the MFP 1 may be configured to form a composite image on the sheet 3 configured of the RFID image (a company logo, statement prohibiting reproduction, or the like) and the image corresponding to the original image.

(3) In the preferred embodiment described above, the restriction process involves writing prohibition data to the RFID tag 7 for prohibiting additional reading processes, but the present invention is not limited to this configuration. For example, the MFP 1 may delete the valid RFID data RD' from the RFID tag 7 or overwrite the valid RFID data RD' with separate data. Alternatively, the MFP 1 may allow only partial reading of the valid RFID data RD' or may add data indicating that the image is to be formed at a lower quality (resolution), thereby allowing image formation at a lower quality. Here, the configuration of the preferred embodiment enables the restriction to be more easily removed, which is not possible if the data is deleted. On the other hand, deleting the data reliably restricts subsequent reproduction of RFID images.

(4) Further, in the preferred embodiment described above, the MFP 1 performs the restriction process after the RFID image was formed one time. However, the MFP 1 may be configured to perform the restriction process after forming the RFID image a prescribed number of times (two or more times).

(5) In the preferred embodiment described above, the restriction process of S505 is performed prior to forming the RFID image in S507, but the present invention is not limited to this configuration. For example, if an RFID reader/writer is disposed near the conveying path between the fixing unit 17 and discharge tray 23, the MFP 1 may be configured to perform the restriction process before the image-forming unit 15 has completed formation of the RFID image, thereby preventing the user from removing the sheet 3 before the restriction process has been performed.

(6) The preferred embodiment described above gives an example of a plurality of RFID data RD stored in a single RFID tag 7 or 39, but the present invention is not limited to this configuration. For example, the original document 37 and the sheet 3 may be provided with a plurality of RFID tags, with each RFID tag storing one or more RFID data RD.

(7) The preferred embodiment described above gives an example of implementing the present invention with a standalone MFP 1, but the present invention is not limited to this configuration. For example, the image-forming system of the present invention may be configured of a standalone document-reading unit 27 and a separate image-forming device without the document-reading unit 27, whereby the two devices are connected and capable of performing bi-directional communications. Alternatively, the image-forming system may include a plurality of image-forming devices with a facsimile function (facsimile machines), whereby one facsimile machine (the MFP 1 in FIG. 2, for example) reads RFID data while another facsimile machine (the external device 73 in FIG. 2, for example, having the same functions as the MFP 1) forms an image based on this RFID data.

What is claimed is:
1. An image-forming system comprising:
a data-reading unit that reads first additional data from a first storing member of a sheet member;

an image-forming unit that forms a first image based on the read first additional data by the data-reading unit;

a restricting unit that gives a restriction to the first additional data stored in the first storing member after the first additional data is read, in order to restrict, after forming the first image by the image forming unit, further formation of the first image based on the first additional data stored in the first storing member;

a first determining unit that determines whether or not the first image has been formed on the sheet member, and wherein the image-forming unit forms on a recording medium the first image based on the additional data if the first determining unit determines that the first image has not been formed on the sheet member;

a second determining unit that determines whether or not the recording medium has a second storing member, and wherein the image-forming unit forms on the recording medium the first image based on the additional data if the second determining unit determines that the recording medium does not have the second storing member; and a third determining unit that determines whether or not the second storing member stores second additional data that is allowed to form a second image based on the second additional data, if the second determining unit determines that the recording medium has the second storing member, and wherein the image-forming unit forms on the recording medium the first image based on the additional data if the third determining unit determines that the second storing member does not store the second additional data.

2. The image-forming system according to claim 1, wherein the image-forming unit forms the first image on the sheet member based on the first additional data, and
wherein the restricting unit gives the restriction to the first additional data in order to prohibit forming the first image based on the first additional data.

3. The image-forming system according to claim 1, wherein the restricting unit gives the restriction to the first additional data stored in the first storing member before the image-forming unit forms the first image based on the read first additional data by the data-reading unit.

4. The image-forming system according to claim 1, wherein the first storing member stores a plurality of sets of additional data,
wherein the data-reading unit reads at least one set of additional data from the plurality of additional data sets in the first storing member,
wherein the image-forming unit forms at least one image based on the at least one set of additional data, and
wherein the restricting unit gives a restriction to the at least one set of additional data stored in the first storing member after the at least one set of additional data are read, in order to restrict the at least one image from being formed based on the at least one set of additional data stored in the first storing member subsequently.

5. The image-forming system according to claim 1, further comprising a determining unit that determines whether or not the restricting unit gives the restriction to the first additional data, and
wherein the restricting unit gives the restriction to the first additional data based on a determining result of the determining unit.

6. The image-forming system according to claim 5, wherein the determining unit that determines based on instruction data stored in the first storing member.

7. The image-forming system according to claim 1, wherein the restriction indicates that restriction data is written to the first storing member, the restriction data indicating that the first image is restricted from being formed based on the first additional data stored in the first storing member.

8. The image-forming system according to claim 1, wherein the restriction indicates that the first additional data is deleted from the first storing member.

9. An image-forming device comprising
a data-reading unit that reads first additional data from a first storing member of a sheet member;
an image-forming unit that forms a first image based on the read first additional data by the data-reading unit;
a processor; and
a memory storing instructions that, when executed by the processor, cause the processor to perform the following steps;
giving a restriction to the first additional data stored in the first storing member after the first additional data is read, in order to restrict the first image from being formed based on the first additional data stored in the first storing member subsequently,
first determining whether or not the first image has been formed on the sheet member,
second determining whether or not a recording medium has a second storing member,
third determining whether or not the second storing member stores second additional data that is allowed to form a second image based on the second additional data, if a result of the second determining is that the recording medium has the second storing member, and
wherein the image-forming unit forms on the recording medium the first image based on the additional data if a result of the first determining is that the first image has not been formed on the sheet member,
wherein the image-forming unit forms on the recording medium the first image based on the additional data if a result of the second determining is that the recording medium does not have the second storing member, and
wherein the image-forming unit forms on the recording medium the first image based on the additional data if a result of the third determining is that the second storing member does not store the second additional data.

* * * * *